United States Patent
Amendolea

[19]

[11] Patent Number: 5,950,503
[45] Date of Patent: Sep. 14, 1999

[54] OPEN CENTER TURNTABLE ASSEMBLY

[76] Inventor: Richard Michael Amendolea, 4546 Quaker Ct., Canfield, Ohio 44406

[21] Appl. No.: 08/914,567

[22] Filed: Aug. 19, 1997

Related U.S. Application Data

[63] Continuation-in-part of application No. 08/866,185, May 30, 1997, abandoned.

[51] Int. Cl.$^6$ .................................................. B23Q 16/02
[52] U.S. Cl. ...................................... 74/813 R; 74/813 C
[58] Field of Search ................................. 74/813 R, 816, 74/813 C; 29/563, 38 B, 48.5 R, 36, 38 R, 38 A, 38 C; 108/20, 21, 22, 139, 142, 103, 104

[56] References Cited

U.S. PATENT DOCUMENTS

| | | | |
|---|---|---|---|
| 748,116 | 12/1903 | Stoll ........................................ | 108/20 X |
| 4,237,796 | 12/1980 | Gordon et al. ............................ | 108/22 |
| 4,987,765 | 1/1991 | Nishimura et al. ..................... | 29/563 X |
| 5,694,685 | 12/1997 | Millas .................................. | 29/38 A X |
| 5,784,932 | 7/1998 | Gilberti .................................. | 74/813 R |

Primary Examiner—John A. Jeffery
Assistant Examiner—MaryAnn Battista
Attorney, Agent, or Firm—Webb Ziesenheim Logsdon Orkin & Hanson, P.C.

[57] ABSTRACT

An assembly for carrying out operations in the transfer, manufacture, or assembly of components having an open center turntable, rotatable about a vertical axis, having a number of work positions adapted for alignment with component supply, assembly, and removal. The platform is movably borne on an open center fixed base support, by means of bearings journalled between the support and the turntable proximate the work force exerted on the component at the turntable work station. The platform is rotated about the open center fixed support by means of a substantially circular drive hub attached to the platform. A drive belt, coupled to the drive pulley of a motor, located beneath the platform peripherally engages the drive hub about a circular belt raceway attached to the hub. As the drive pulley rotates, the turntable rotates through a defined set of motions by means of the drive belt arrangement. Complex motion profiles such as indexing, continuous and variable speed rotation, reversing, and oscillating can be accomplished, at varying table angles with diminished drive power requirements, due to reduced table inertia. The underneath driven, open center turntable provides increased work space, tool placement and the ability to place one table interior another.

16 Claims, 3 Drawing Sheets

OPEN CENTER TURNTABLE ASSEMBLY

The present application is a Continuation-in-Part of application Ser. No. 08/866185 filed May 30, 1997, for Open Center Turntable Assembly, now abandoned. The parent application, which is incorporated by reference in its entirety, discloses an assembly having an open center turntable, rotatable about a vertical axis, having a number of work positions adapted for alignment with component supply, assembly, and removal which is movably borne on an open center fixed base support, by means of bearings journalled between the support and the turntable proximate the work force exerted on the component at the turntable work station being driven proximate the periphery thereof.

BACKGROUND OF THE INVENTION

1. Field of the Invention

This invention relates to rotatable assemblies for supporting and/or positioning work pieces for manufacture, transfer or assembly; and more particularly to such assemblies which are peripherally supported and non-centrally driven by drive means inboard of the platform.

2. Description of Related Art

Rotating tables, platforms, or assemblies that provide component or work piece support, positioning, and transfer are used in manufacturing, material handling and assembling processes. One type of such assembly is known as a turntable or indexing table which can selectively accommodate different types of tooling or work pieces which are moved into precise position, for example, proximate a work station. Rotating platforms or table assemblies, which rotate about a vertical axis, are typically used in manufacturing, material handling, and assembly processes to move articles such as components, fixtures, work pieces, tooling and the like through precisely defined rotational angles in a plane substantially parallel to the table surface.

With the need for very precise machining and close tolerances in manufacture, turntables have had to be much more precise and provide more through-put in order for industry to remain competitive. Turntables, for example, may be required to move through a complex set of rotary profiles such as continuous rotation, indexing with a dwell time, oscillation, variable speed or reverse direction. It would be advantageous to have an assembly capable of all these motions while maintaining precision. In addition, with the advent of robotics these assemblies are required to place a workpiece at various work angles relative to the work station to provide access from automated operational equipment.

Typically, prior art turntables or indexing tables are centrally driven and work is performed at the periphery of the table. Because of the distance from the workpiece to the central support, extreme moments and forces on the drive mechanism are created. The drive system design must accommodate high torque and energy requirements, thus increasing the size and cost while diminishing the precision of the drive system.

The limitations of such assemblies are exacerbated where both the support and the drive system are located near the center of the table. Both the drive and support system are subjected to large moment loads exerted by the table mass in conjunction with external loads applied toward the periphery of the table by manufacturing or assembly operations. As a result, the tables have had to be more or less solid and sufficiently thick to minimize deflection at their periphery. This has resulted in even greater mass requirements, subjecting the drive and support systems to even greater loads and increasing inertia. Thus, greater energy is required to drive the table, start and stop it, or reverse direction.

Additionally, with the advent of robot aided and multidimensional work operations to be performed at a particular station, the necessity for these platforms to be positioned, lifted and canted in various orientations has become heightened. Further, with multifaceted workstations, angles of attack for assemblies and tools have become more critical, requiring positioning of robots and tooling at other than single locations. Because of the preciseness of the operations to be performed at a particular work station, the indexing and rotational positioning of such tables has become hypercritical. Additionally, the use of large mass, centrally driven assemblies precludes the use of, for example, centrally mounted robots or the use of two tables, one inside the other, offset in a manner to allow a spaced relationship of work pieces and/or assemblies and manufacturing mechanisms.

Alternately, when tables are driven on their outside diameter, the drive mechanism tends to be outside the periphery of the table and thus impedes use of the assembly in various angles and in operations where space is at a premium. Additionally, this configuration interferes with operations to be performed with large overhanging work pieces. Thus, for example, in operation where apparatus is necessary in close proximity to platform and space at the periphery is at a premium, it would be useful to have an assembly wherein the entire drive mechanism could underlay the support structure and avoid protruding into the space around the periphery of the platform yet not be centrally driven. Further, it would be advantageous to have a table or platform wherein tooling and/or fasteners such as hooks or the like could be fastened directly to the peripheral edge of the assembly. With peripheral driven mechanisms this is not possible.

Assemblies which contains the drive means outside the periphery of the platform suffer numerous other disadvantages. Specifically, these exposed drive mechanisms are subject to the operating environment of the work. Thus, fluids, tailings, chips and other contaminants can damage the mechanism or otherwise render it inoperable. Additionally, platform support bearings mounted inboard of the drive mechanism are more difficult to service and maintain. Out board mounted drive mechanisms also create a hazard to workers in the area.

It would be highly desirable to have a platform or table which could be very precisely positioned at any angle in order to accommodate multifaceted angles of operation as well as providing a lightweight, versatile, open center configuration such that more than one table can be offsettingly positioned, one inside the other, to provide spacing for robotics at center positions within the platform without the drive mechanism interfering. Further, it would be advantageous to provide a platform which is movably supported and driven proximate the work piece such that torques and loads applied at a work station are absorbed proximate their application without creating large moment arms. Further, it would be advantageous to drive the platform from beneath such that neither the motor or the actual driving mechanism was exposed yet the drive mechanism was disposed proximate the platforms outer rim for driving accuracy and reduction of forces required for movement but was not on the outside perimeter of the platform where it could snag, catch or rub. Further, it would be advantageous to have such an assembly which is lightweight, is relatively inexpensive when considered against the centrally driven tables, requires less energy and provides easy maintenance, flexibility and better access to the work piece at a work station.

While some attempts have been made to overcome these difficulties individually, no present system overcomes all the limitations discussed and provides all the desired attributes. By way of example, the limitations of the prior art are shown in U.S. Pat. No. 5,201,249 to Sterenberg which discloses a system utilizing a center drive shaft and bearing system. The system attempts to achieve greater versatility by incorporating a second drive shaft driven by a second motor within a hollow first drive shaft driven by a first motor so that a second table, mountable to the second drive shaft, can be rotated in a different motion from a first table mounted to the first drive shaft. U.S. Pat. No. 2,965,208 to Forster discloses a system utilizing a central shaft operably connected to its drive to rotate the table. The table also supports a plurality of rotatable spindles separately driven to accommodate actions requiring rotation of the work piece at an indexed position of the table. U.S. Pat. No. 5,170,678 to Wawrzyniak discloses an index table which utilizes a table top having an open center and ring gear/pinion gear drive system located beneath the rim of the table top. The table top is supported on a fluid (air or oil) cushion during rotation. After the position is indexed, the cushion is removed and the table top lowered by gravity into place on a fixed support. While suited for its intended purpose, this assembly still suffers from the limitations here discussed and is not readily adaptable for operation in a variety of orientations. A commercial assembly marketed by Camco utilizes a shaft-driven cam to drive an index table wheel having a center hole and supported by a bearing system located beneath it. This system is also limited in its operational versatility, is still weighty, and does not minimize energy requirements. It would therefore be advantageous to have an assembly wherein the entire drive mechanism could underlay the support structure and avoid protruding into the space around the periphery of the platform. Further, it would be advantageous to have a table or platform wherein the rotatable support and the drive was proximate the work load on the platform to provide better stability and accuracy and wherein tooling and/or fasteners such as hooks or the like could be fastened directly to the peripheral edge of the assembly. With peripheral driven mechanisms this is not possible.

SUMMARY OF THE INVENTION

It has now been discovered that the disadvantages of the prior art can be overcome with an assembly capable of diverse operating positions and a variety of precise movements and motions wherein the outer dimensions of the table are the defining work space required for utilization. The assembly of the present invention is lightweight, versatile, low cost and provides for greater latitude in placement of workpieces, tooling and operational/processing equipment, such as robots and allows use of equipment proximate the periphery of the assembly without interference by any component of the drive assembly. The assembly of the instant invention has low drive system inertial requirements, excellent speed and positioning accuracy, and minimum deflection due to moment loading; and may be used in a variety of operational orientations, including an inverted mode greater than 45 degrees without the requirement to allow for space adjacent the assembly, either on the inside diameter or the outside diameter, to provide for a drive mechanism.

In accordance with the invention, there is provided an assembly for carrying out operations in the transfer, manufacture or assembly of objects, workpieces or components.

The assembly has an open center platform which is movably supported on a fixed base and rotatable about a central vertical axis by means of a drive mechanism disposed substantially beneath the platform. The platform, which can be of any shape, has at least one work station position for supporting an object. The open center platform is movably supported on a substantially circular open center base or support proximate the workstation. The platform is moved by drive means which engage the assembly from beneath the platform and do not extend or protrude from the interior or the exterior of the platform. In one embodiment the platform is secured to an open center, substantially circular support and drive hub which is movably borne on the open center base, proximate the work force exerted on an object supported upon the platform or turntable at a work station, by means of a bearinged raceway. In another embodiment, the support and drive hub contains a circular belt raceway substantially disposed entirely beneath the platform. The platform is rotated by means of a drive belt which engages the circular belt raceway and the drive pulley of a motor located beneath the table. As the drive pulley rotates, the turntable rotates through a defined set of motions by means of the drive belt arrangement. Complex motion profiles, such as indexing, continuous and variable speed rotation, reversing, and oscillating, can be accomplished at varying table angles with diminished drive force requirements due to reduced table inertia. The open center turntable utilizing the drive mechanism disposed completely beneath the table provides increased work space, greater variability in tool placement and the ability to place one table interior another. It also prevents snagging and/or rubbing of the belt on objects or workpieces located adjacent the interior or the exterior of the table.

In one aspect, an open center, rotating, platform or table, is movably supported proximate the workstation on an open center, stationary base . In another aspect, a drive hub, deposed beneath the table, having an engagement rim mounted substantially perpendicular to the hub surface, interior the periphery, is affixed directly to the platform and the platform is movably supported on the open center base. The open center of the assembly allows a second table or platform to be placed within the open center interior of the first platform. The second platform can be concentric with the first or it can be non-concentric.

The assembly of the instant invention, which preferably utilizes an open center, thin, ring-shaped support and drive hub affixed to the platform on the under side thereof, is rotatably supported on a ring-shaped base proximate the work load and moved by a drive means which engages the support and drive hub beneath the platform and is energized by a motor likewise disposed substantially beneath the platform. More specifically, the assembly is a ring-shaped movable platform having an open center, affixed to a support and drive hub which is movably mounted on a ring-shaped base plate by means of bearings or rollers positioned proximate the periphery of the ring shaped, movable platform and positioned to minimize the load applied to the assembly during operation. The table or platform is preferably driven by means of a tensioned belt which engages a belt raceway mounted perpendicular the support hub beneath the platform. The belt is energized by engaging at least one drive pulley which communicates with a motor means disposed substantially beneath the platform.

In a preferred embodiment of the invention, an open center platform is affixed to ring-shaped support and drive hub which is rotatably supported on a circular track by means of V-profile rollers journalled on a V-profiled interior, peripheral edge of a base. The platform or table is rotationally driven by means of a belt system tensioned about an outer peripheral wall of the drive hub which is positioned substantially beneath the table to provide a variety of precise and complex motion profiles to the platform such that indexing, continuous rotary, reversing, and oscillating motions are accomplished by movement of the belt. In accordance with the preferred embodiment, the platform and the support and drive hub form a single unit which is moveably attached to an open center base. The ring configuration of the support and drive hub and base of the assembly, and the mounting of the drive system beneath the platform allow ancillary equipment such as robotic apparatus, process machinery, a second index table, or the like, to be located both inside the periphery of the platform and the base subassembly as well as outside the periphery, thus maximizing the utilization of factory space and the number and variety of processing configurations which can be employed as well as minimizing snagging or rubbing of the mechanism on factory objects or over hanging work pieces. The lightweight construction of the assembly allows it to be readily moved and mounted at a variety of orientations to a factory floor, wall, or even ceiling.

In another embodiment an open center platform is, in addition to being supported on a circular track by means of V-profile rollers journalled on a V-profiled interior, peripheral edge of a base, rotationally supported on roller bearing assemblies deposed directly beneath the platform and adopted to ride on a surface formed on the support hub.

Other objects, features, and advantages of the present invention will become more fully apparent from the following detailed description of a preferred embodiment, the appended claims, and with reference to the accompanying drawings which form a part of the specification.

DESCRIPTION OF THE PREFERRED EMBODIMENTS

Figures 1, 2:
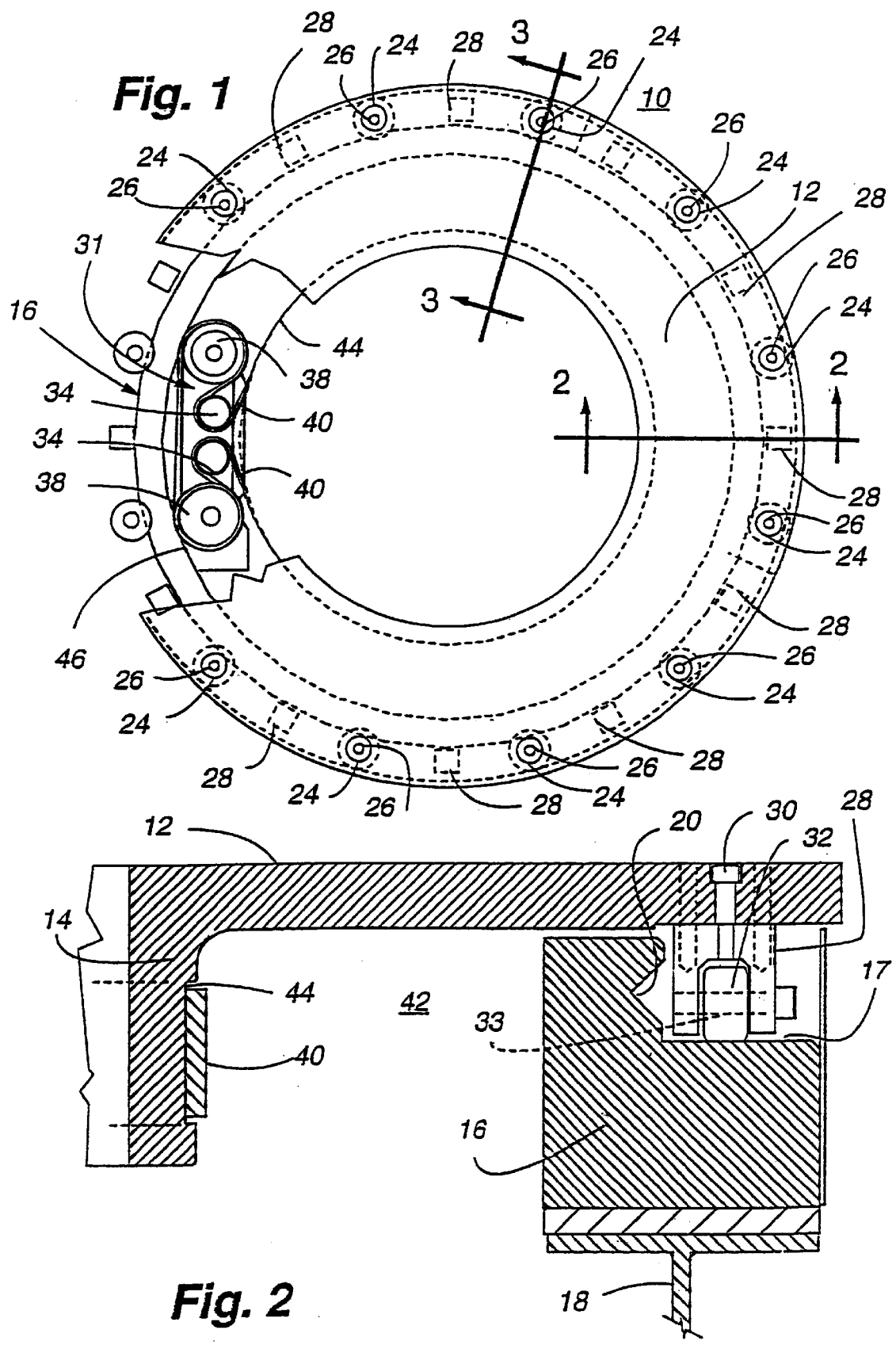
FIG. 1 is a top cut away view, partially in phantom, illustrating one preferred open center turntable assembly with the drive assembly disposed beneath the platform embodying the principles of the invention.
FIG. 2 is a partial sectional view, taken along the line 2—2 of FIG. 1 showing the roller bearing assemblies.

FIG. 1, illustrates, by way of example, the structure of the preferred embodiment of an open center turntable assembly 10 which incorporate the beneath the platform drive principles of the present invention.

As shown in the preferred embodiment of FIG. 1 the turntable assembly 10 is provided with a work supporting platform 12 configured with a selected functional inner and outer peripheral contour and having an open center. The platform 12 is used to support work pieces, tooling, fixtures, and the like for positioning in accordance with the invention. While the turntable assembly 10 is particularly adapted for manufacturing and assembly operations, it is also useful in other processing environments such as inspection and gauging.

The drive rim 14 is in the shape of a rim perpendicular to the work supporting platform 12. The drive rim 14 is fixedly supported on the platform 12, for example, as, a single molded piece. The platform 12 is rotatably supported on a fixed or non-rotating support base 16 which is also configured in a ring like shape and is concentric with the platform 12 to form a circular "track" for the platform 12 to rotate about. In accordance with the present invention, work supporting platform 12 of the turntable assembly 10 is rotated to produce the desired movement or positioning of supported objects. Preferably a plurality of supports 18 are conventionally attached directly to the underside of the non-rotating support base 16 as by for example threaded fasteners (not shown). The supports 18 can be replaced by any conventional fastening/support means which allows for rotation of platform 12 about support base 16.

Describing the rotational mounting of the platform 12 more particularly, as best seen in FIG. 2, at the outer edge of the non-rotating support base 16 there is formed a flattened raceway 17 which runs parallel to the bottom surface of platform 12. A number of load bearing roller assemblies 28 are mounted on the bottom of the ring-shaped platform 12, by means of support fastners 30, at spaced circumferential locations about the platform 12. Each load bearing roller assembly 28 contains a bearing wheel 32 adopted to readily roll on raceway 17. As shown in FIG. 2, bearing wheels 32 are supported on pins 33. The load bearing roller assemblies 28 thus movably support the bearing load of platform 12 on the base 16 for rotation relative to the base 16.

Describing the rotational mounting of the platform 12 with more particularly, as best seen in FIG. 1, a second set of load bearing rollers in the form of V-shaped roll 24 is, for example interspersed between the roller load bearing assemblies 28. As better seen in FIG. 3, the inner edge of the non-rotating base 16 is formed as a V-shaped indent or groove 20 forming an indented V-shaped profile. A number of V-shaped rollers 24 are rotatably mounted to the bottom of the ring-shaped platform 12, on V-roller pins 26, at equally spaced circumferential locations about the platform 12 to readily roll about their respective pins 26. The V-shaped rollers 24 are configured with a mating V-profile and are journalled on the outer surfaces of the support base 16 to movably support the platform 12 on the base 16 for rotation relative to the base 16.

In this manner, the platform 12 is free to rotate relative to the base 16 without suffering radial or other movement to upset its centering relative to the base 16 and without falling off the base 16 regardless of the orientation of the turntable assembly 10. It will be realized that the load bearing roller assemblies 28 are not required for uses with lighter loads and will have no effect upon whether the turntable assembly 10 can be oriented at an angle or even upside down. It will be appreciated that a bearing configuration wherein the V-shaped rollers 24 are journalled on the outer surfaces of the platform 12 is also operable but not preferred. It will be appreciated that other bearing configurations such as cam, ball, or other roller bearings could be employed as part of the bearing and positioning system to rotatably support and position the platform 12.

As seen in FIG. 1, the platform 12 is rotated by drive system 31 mounted underneath platform 12. More specifically, a drive housing 46 is conventionally mounted underneath base 16. The location of the drive system 31, outside the area circumscribed by the open center of the platform 12 and substantially beneath base 16, allows for ready access to the drive system 31 and keeps the area free for locating ancillary equipment. The positioning of the drive system 31 inboard of the support bearings (28 and 24) allows easy access to all bearing assemblies.

Figure 3:
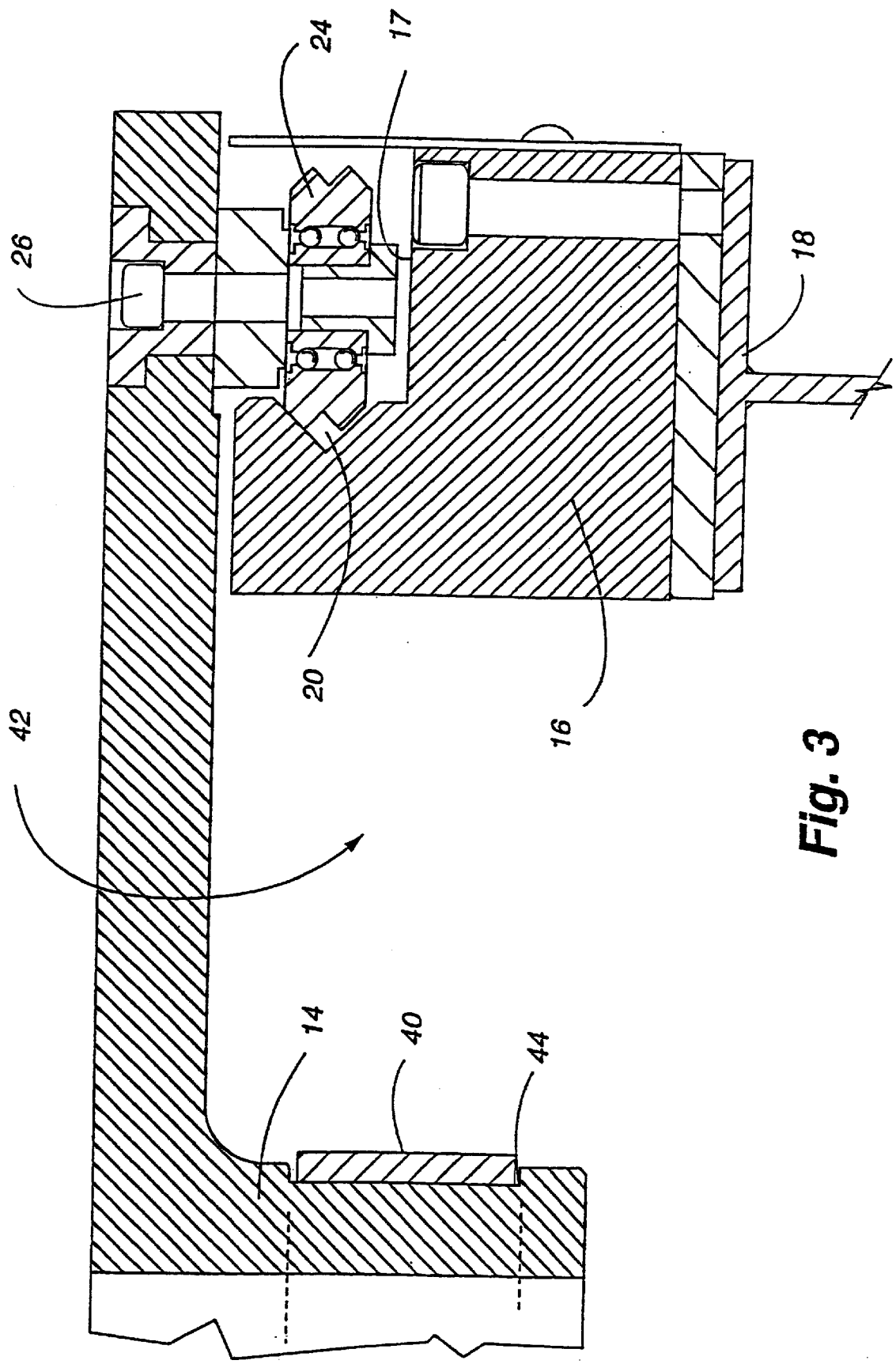
FIG. 3 is sectional view, taken along the line 3—3 of FIG. 1 showing one embodiment of the v-groove roller assemblies.

A pair of drive pulleys 34 are conventionally rotatably mounted on drive housing 46, to mechanically engage the motor of drive system 31 and a pair of tensioning rollers 38 are conventionally rotatably mounted to drive housing 46. The tensioning rollers 38 route a drive belt 40 to the drive pulley 34. As best seen in FIG. 3, the drive rim 14 is orthogonal to support 12 and contains defined therein a belt raceway 44 to provide a contiguous channel about the rim 14. The drive rim 14 is spaced from the outer peripheral edge of base 16 so as to provide rotational space 42 between the rim 14 and the base 16. The drive belt 40 is wrapped around the rim 14 and placed within the channel of the belt raceway 44 to frictionally engage and drive the drive rim 14. It will be appreciated that the drive pulley 34 can also be a toothed sprocket to engage a synchronous timing type belt, a metal belt, a chain, and the like. It will also be appreciated that the tensioning rollers 38 could also be -powered to augment the drive roller. It will also be appreciated that a separate rather than an integral drive raceway could also be used.

The motor of drive system 31 is connected in driving arrangement with the drive pulleys 34. The motor, which is mounted under platform 12 within rotational space 42, has suitable precision characteristics and control features. Suitable types of motors include hydraulic and pneumatic gear motors, clutch/brake gear motors, servo-gear motors, stepper motors, and other motors. The inventor has found a servo-gear motor Model No. IQ 2000, sold by Electro-Craft, of Eden Prairie, Minn. to provide adequate positioning characteristics and to be suitably controllable for providing complex motion profiles to the assembly such as indexing, continuous rotary, reversing, oscillating, etc. necessary for a desired industrial application. The turntable assembly 10 is thus usable as a conventional indexer having defined dwell periods between periods of rotary motion or may be used to continuously move a work piece though a series of rotary positions.

While the illustrative embodiment utilizes a pulley and belt type drive system, it will be appreciated that other drive arrangements may be utilized to drive the platform 12, such as a gear or a frictional wheel driven arrangement beneath the platform within the rotational space engaging the interior surface of drive rim 14 (not shown). It will be appreciated that any direct drive engagement to a reaction surface on the drive hub 14 will reduce the work and force requirements of the drive system 31.

Figure 4:
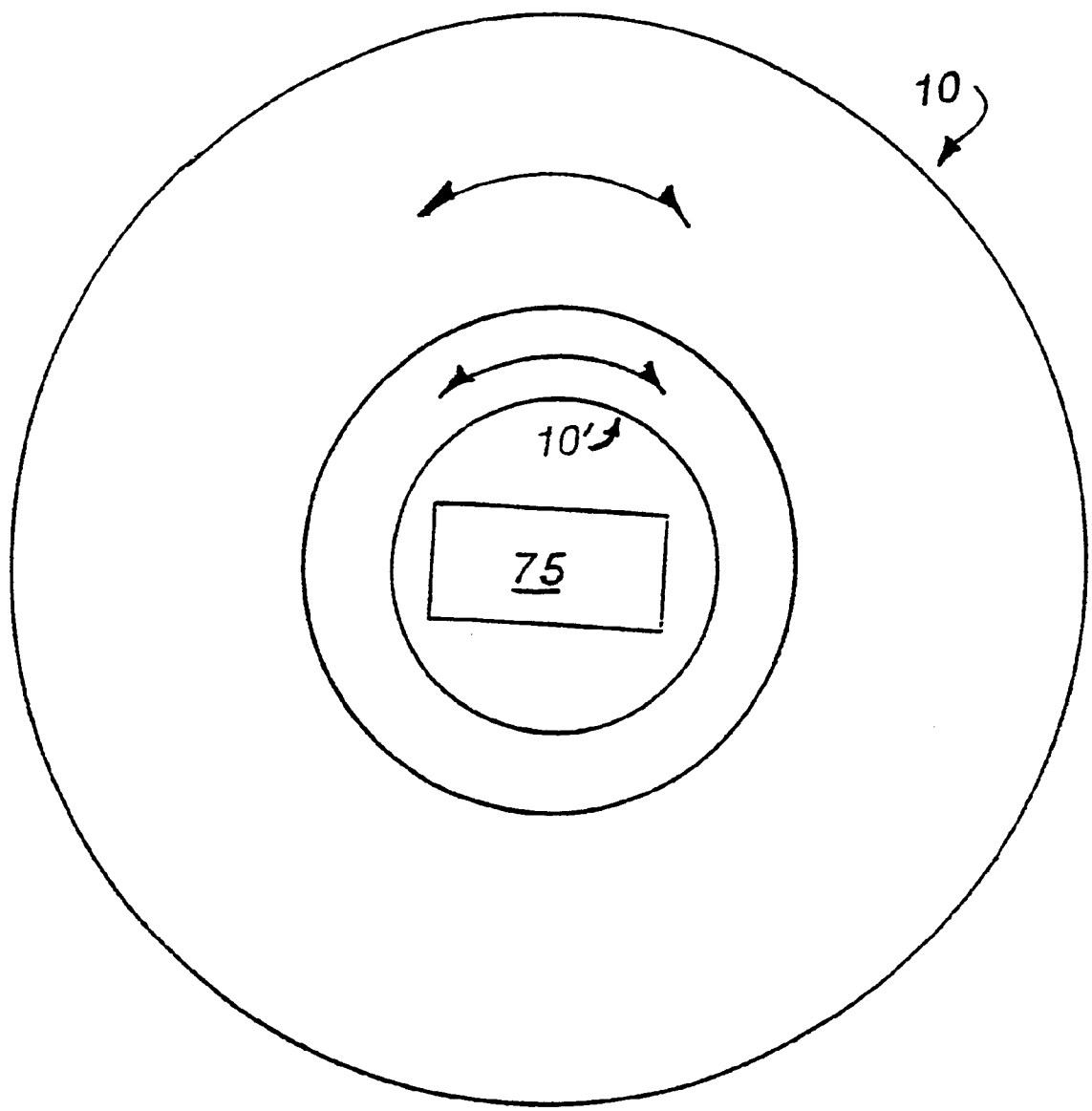
FIG. 4 is a schematic view of an operative assembly of the open center turntable assembly of the present invention.

As previously stated, the platform 12 may be of any shape desired. From the aforedescribed, it will be appreciated that the present invention provides a lighter, more efficient, more precise, and more versatile assembly than here before used, maximizing the number of possible locations and available space for the placement of ancillary work devices, and providing easy accessibility to the drive system and to the bearing system. While one illustrative preferred embodiment of this invention has been shown and described in detail above, those skilled in the art will readily appreciate that many modifications are possible in the exemplary embodiments without materially departing from the novel teachings and advantages of this invention. For example FIG. 4 schematically illustrates an open center turntable assembly 10 with a second open center turntable 10' placed concentrically within the open interior of the open center turntable assembly 10. A processing mechanism, such as a robotic device 75, may be positioned within the open interior of the open center turntable assembly 10. Accordingly, all such modifications are intended to be included within the scope of this invention as defined in the following claims. Thus, it should be understood that this invention is not to be limited to the exact forms disclosed and many changes in detail and construction of the invention may be made without departing from the spirit thereof.

In the claims:

1. An assembly for positioning an object, said assembly comprising:

an open center stationary base, said base having an inner peripheral base edge that defines an open center of said base;

an open center platform having an outer peripheral edge and an inner peripheral edge, said inner peripheral edge defining an open center of said platform and said platform adapted to support the object;

means for movably supporting said platform on said base for rotational movement of said platform relative to said base, wherein said means for movably supporting said platform on said base are disposed between said outer peripheral edge of said platform and said inner peripheral edge of said platform and do not extend into said open center of said platform; and drive means disposed substantially beneath said platform between said outer peripheral edge of said platform and said inner peripheral edge of said platform and do not extend into said open center of said platform, said drive means supported by said base and operably connected to said platform for rotationally moving said platform about said base, wherein said drive means includes a drive pulley having a rotational axis parallel to a rotational axis of said platform.

2. The assembly of claim 1 wherein said platform and said base are substantially ring-shaped and wherein the outer diameter of said platform is greater than the outer diameter of said base.

3. The assembly of claim 1 wherein said platform is adapted for oscillating, indexing, reversing, or continuous rotary movement.

4. The assembly of claim 1 wherein said means for movably supporting said platform comprises at least one set of bearing means journalled between said platform and said base.

5. An assembly for positioning an object, said assembly comprising:

an open center stationary base, said base having an inner peripheral base edge that defines an open center of said base, wherein said said base includes indented support surfaces forming a profile;

an open center platform having an outer peripheral edge and an inner peripheral edge, said inner peripheral edge defining an open center of said platform and said platform adapted to support the object;

means for movably supporting said platform on said base for rotational movement of said platform relative to said base, wherein said means for movably supporting said platform on said base are disposed between said outer peripheral edges of said platform and said inner peripheral edge of said platform, and wherein said means for movably supporting said platform on said base comprises rollers rollingly mounted to said platform, each said roller supported within said support surfaces of said base and having a profile for mating engagement therewith; and drive means disposed substantially beneath said platform, said drive means supported by said base and operably connected to said platform for rotationally moving said platform about said base.

6. The assembly of claim 1 wherein said platform further comprises a drive hub disposed inwardly of said outer peripheral edge of said platform, said hub adapted to operatively engage said drive means for rotational movement of said platform about said base.

7. The assembly of claim 6 wherein said drive hub comprises an extension wall at a selected angle from said platform and said drive means operably engages said wall.

8. The assembly of claim 6 further including a second said open center platform rotatably supported on a second said open center base, wherein said second said open center platform is concentric with said platform and includes an outer diameter substantially equal to an inner diameter of said platform.

9. The assembly of claim 6 wherein said drive means further includes:

a drive belt operatively connected to said drive pulley and to the drive hub of said platform; and motorized means for rotating said drive pulley.

10. A method of placing an object in position for performing an operation thereon, said method comprising the steps of:

providing an open center stationary base, said base having an inner peripheral base edge that defines an open center of said base;

providing an open center platform movably supported on said base proximate said object, said platform having an outer peripheral edge and an inner peripheral edge, said inner peripheral edge defining an open center of said platform;

supporting said object on said platform;

providing a means for movably supporting said platform on said base for rotational movement of said platform relative to said base, wherein said means for movably supporting said platform on said base are disposed between said outer peripheral edge of said platform and said inner peripheral edge of said platform and do not extend into said open center of said platform;

providing drive means disposed substantially beneath said platform between said outer peripheral edge of said platform and said inner peripheral edge of said platform and do not extend into said open center of said platform, said drive means supported by said base and operably connected to said platform for rotationally moving said platform about said base, wherein said drive means includes a drive pulley having a rotational axis parallel to a rotational axis of said platform; and driving said platform for rotation relative to said base by said drive means from a position substantially beneath said platform thereby positioning said object at one or more selected angular positions.

11. The method of claim 10 wherein said step of driving said platform is performed by operably connecting a drive motor having a rotational axis, disposed substantially beneath said platform, with said rotational axis of said drive motor located substantially adjacent to the periphery of said platform.

12. The method of claim 10 further including the steps of;

providing at least one processing means;

placing said processing means inside of said open center of said platform.

13. The method of claim 10 further including the step of providing a second said open platform rotatably supported on a second said open center base, wherein said second said open center platform is concentric with said platform.

14. The method of claim 10 wherein said processing means includes a robotic device.

15. The method of claim 10 wherein said platform is rotated in a continuous motion.

16. The method of claim 10 wherein said platform is rotated in an intermittent motion.

* * * * *